Aug. 2, 1960

G. M. SPEAR 2,947,062

ROTARY CUTTER FOR GEARS AND THE LIKE

Filed Aug. 18, 1953

INVENTOR.
GILMORE M. SPEAR
BY Richard W. Treverton

Aug. 2, 1960
G. M. SPEAR
2,947,062
ROTARY CUTTER FOR GEARS AND THE LIKE
Filed Aug. 18, 1953
2 Sheets-Sheet 2
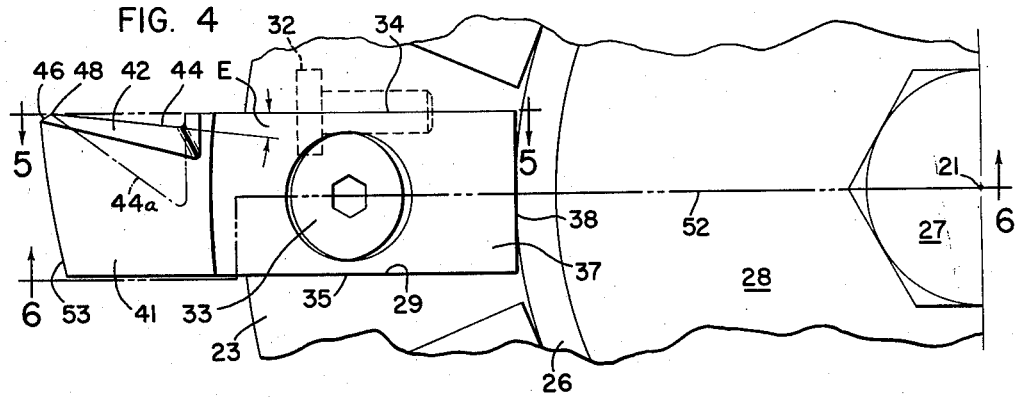
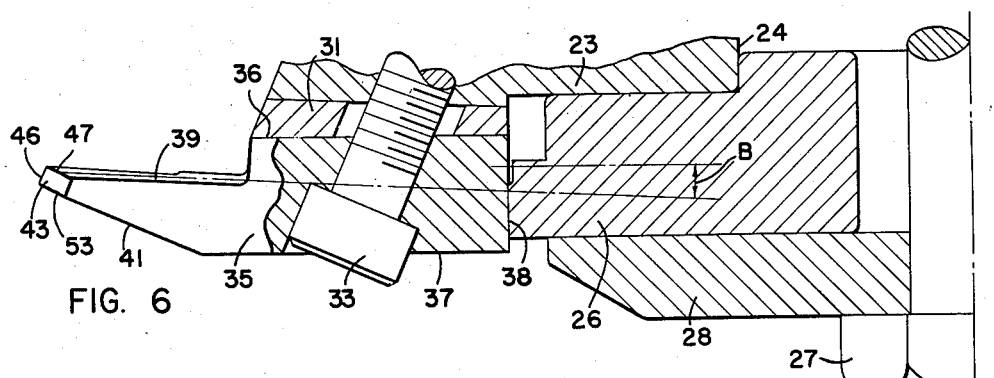
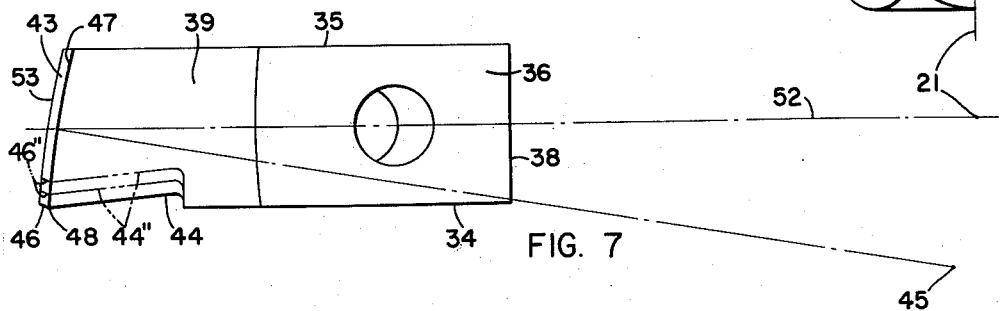
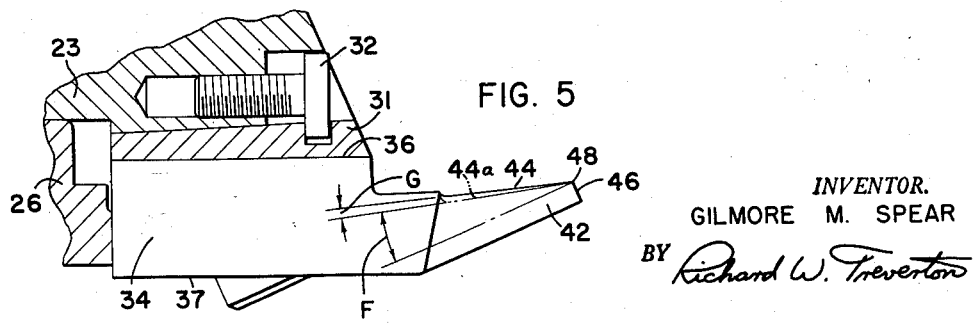
INVENTOR.
GILMORE M. SPEAR
BY Richard W. Treverton

United States Patent Office 2,947,062
Patented Aug. 2, 1960

2,947,062

ROTARY CUTTER FOR GEARS AND THE LIKE

Gilmore M. Spear, Rochester, N.Y., assignor to The Gleason Works, Rochester, N.Y., a corporation of New York Filed Aug. 18, 1953, Ser. No. 374,965

9 Claims. (Cl. 29—105)

The present invention relates to rotary cutters for gears, face couplings and like toothed and splined parts.

The blades of cutters of this kind usually are relieved back of their cutting edges in such a way that the directions of these edges relative to cutter axis remain substantially unchanged as the blades are resharpened by grinding or otherwise cutting back the front faces thereof. The invention has particular relation to cutters of the kind in which after the front face of a blade is cut back only a single rectilinear machine adjustment is necessary to restore the original relationship of the cutting edges to the work. For example in the case of a pair of symmetrical radial bladed or disc cutters adapted to rotate on relatively inclined axes, with their blades interlocking, i.e. with the blades of each cutter entering into interblade spaces of the other cutter, so that side and tip edges of both cutters operate simultaneously in the same tooth space of the work, the cutter blades preferably are so relieved that after resharpening a single adjustment, in a straight line in the plane of symmetry of the cutters, will suffice to restore all of the cutting edges to their original relationship to the work.

Ordinarily the cutting side surface of each blade, i.e. the surface back of the edge which cuts the working face of a gear tooth, is a helicoidal surface. The axis of the helicoid coincides with the cutter axis, and sharpening is effected by successively cutting back the front face of the blade in planes which always bear the same geometrical relationship to the cutter axis, so that these planes are inclined to one another. The process of producing such a helicoidal surface is slow and expensive, since it involves oscillating a rotating abrasive wheel relative to the cutter in a direction to produce the relief, in timed relationship with rotation of the cutter. A special relieving grinder is required to carry out the process on a commercial scale.

It is an object of the present invention to provide rotary cutters, and blades for them, wherein the cutting side faces are plane surfaces which may be produced quickly and inexpensively on ordinary grinding equipment without relieving motion and yet are capable of being restored after sharpening to their original cutting relationship by a single machine adjustment.

According to the invention the plane cutting side surface and the tip face of each blade intersect along a curved line all points of which when rotated into a fixed axial plane lie approximately along a straight line which intersects the cutter axis at an acute angle. Sharpening of the cutter is preferably accomplished by successively grinding or otherwise cutting back the front face of the blade in parallel planes, as distinguished from the prior art method of cutting back in relatively inclined planes, the new method resulting in the direction of the cutting edges remaining the same so that there is little or no change in cutting surfaces of revolution presented by the rotating cutter. This means that the teeth of the work are cut to substantially the same pressure angle throughout the life of the cutter.

The non-plane surfaces of the cutter blades are surfaces of revolution which can also be produced quickly and economically. The clearance side face of each blade is preferably a conical surface whose axis is coincident with the cutter axis, while the tip face is a conical surface whose axis is in offset parallel relation to the cutter axis. This axis of the tip face is so located that the distance between the lines of intersection of the tip face with the cutting and clearance side faces is substantially constant, i.e. that the width of the tip face is substantially constant throughout its length, so that the pair of cutters will have the same range of axial or "point width" adjustment throughout its life.

The foregoing and other objects and advantages of the invention will appear from the following description made with reference to the drawings, wherein:

Fig. 4 is a fragmentary side view of one cutter, the lower cutter of Fig. 2, when viewed in the direction indicated at 4—4 in Fig. 2;

Figure 9:
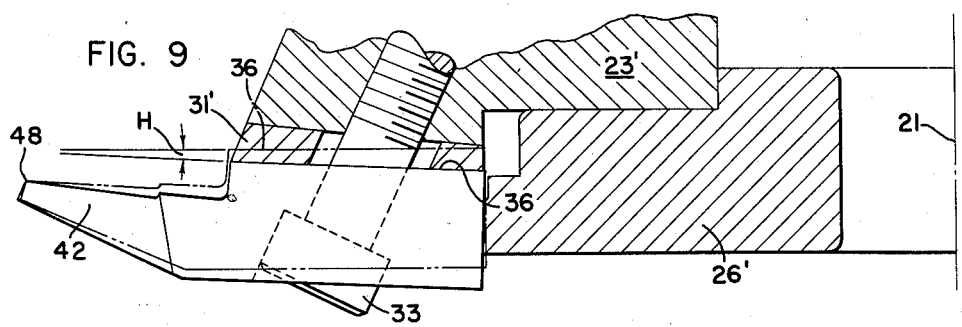
Figure 8:
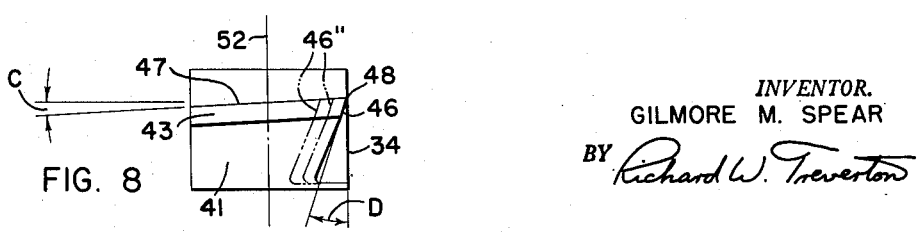

Figs. 5 and 6 are fragmentary sectional views taken in the respective planes indicated by section lines 5—5 and 6—6 of Fig. 4;

Fig. 7 is a view of the side of a cutter blade opposite to that shown in Fig. 4;

Fig. 8 is a tip end view of the blade; and,

Fig. 9 is a view similar to Fig. 5 showing the blade mounted in a head assembly which provides a smaller blade pressure angle.

Figure 1:
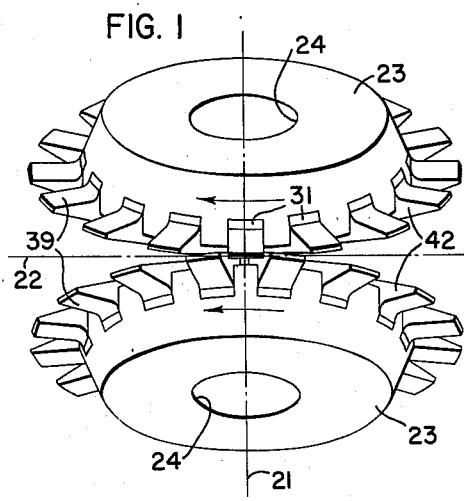
Figs. 1 and 2 are respectively front and side elevational views of a pair of interlocking disc cutters of the present invention in their normal operative relationship to each other.
Figure 2:
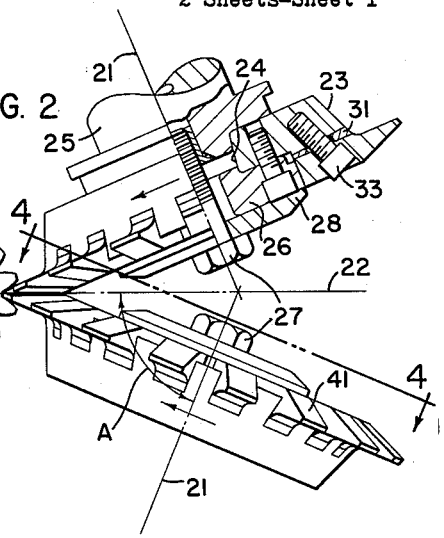

While the principles of the invention may be applied advantageously to cutters of various types, they are of especial advantage in the case of inserted blade interlocking disc cutters of the kind shown in Figs. 1 and 2. The two cutters of the pair shown are the same in size and shape but of opposite hand. They operate simultaneously in the same tooth space of a work piece W, rotating about their respective axes 21. These axes intersect at the plane of symmetry 22 to which they are equally inclined. The spindles 25 of the gear cutting machine are so mounted that the angle A between the cutter axes 21 and the plane of symmetry 22, in the plane of Fig. 2, is fixed. However the angle between these axes and the plane of symmetry, in a perpendicular plane, i.e. in the plane of Fig. 1, is adjustable. This adjustment is necessary in the case of bevel gears in order to position the cutters to produce tooth spaces which properly taper toward the cone apex. In Fig. 1 the cutters are in a position of adjustment to produce no taper, as would be desired when cutting spur gears.

Each cutter comprises a body or head 23 having a tapered central bore 24 for mounting on a cutter spindle 25 of a gear cutting machine. Secured to the head by screws is a blade locating ring 26 having a center that is also received in bore 24. The cutter is secured to the spindle by means of a screw 27, which threads into an insert in the spindle, and a clamp plate 28 which bears upon the ring 26. The front face of the head has a plurality of plane sided radial slots 29 for receiving the shanks of the cutter blades and adjusting wedges 31. The latter are movable radially of the head by means of screws 32 in order to adjust the individual cutter blades on the head in the direction of the cutter axis, the blades after such adjustment being clamped to the head and the ring 26 by screws 33.

The shank of each blade has parallel front and rear faces 34 and 35, parallel inner and outer side faces 36 and 37 which are perpendicular to faces 34 and 35, and an end face 38 which is perpendicular to each of the other faces 34—37. As shown the bore in the shank for receiving screw 33 is parallel to front and rear faces 34 and 35 but inclined at an acute angle to both the inner face 36 and the end face 38 so that when the screw is tightened these faces are drawn respectively against wedge 31 and locating ring 26. The parallel front and rear faces 34 and 35 are spaced so that the shank fits snugly between the side walls of the slots 29, this being necessary since cutting loads are transferred directly from rear face 35 to the head.

The cutting portion of the blade, which projects radially beyond the periphery of the head, has cutting side faces 39, clearance side face 41, front face 42 and tip face 39, clearance side face 41, front face 42 and tip rear face 35 of the shank.

Cutting side face 39 and front face 42 are both plane, and they intersect to form a straight line side cutting edge 44. Tip face 43 is a conical surface whose axis 45 is in parallel offset relation to the cutter axis. One of the elements of this conical surface intersects the front face 42 at a slight angle and accordingly the front face intersects the tip face to form a tip cutting edge 46 which for all practical purposes may be considered to be a straight line.

Figure 3:
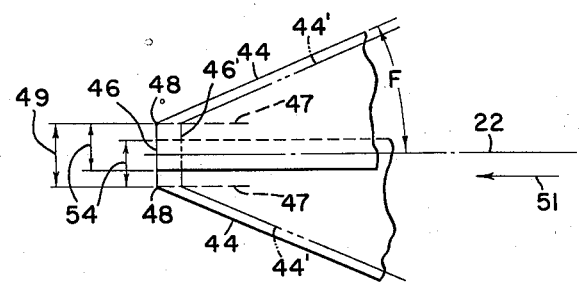
Fig. 3 is an enlarged fragmentary view of the tip parts of adjacent cutter blades in the relationship shown in Fig. 2.

Cutting side face 39 and tip face 43 intersect along a curved line 47 which represents the locus of the point of intersection 48 of the side and tip cutting edges 44 and 46 as the front face of the blade is cut back by repeated resharpening. Referring to Fig. 3, the direction of edge 47 is such that regardless of how much the front face is cut back, i.e. how far back along edge 47 the point 48 is moved, it will be at the same distance from the plane of symmetry 22 when the front face is rotated about the cutter axis into the plane common to both cutter axes. That is, all points of curved line 47 when rotated into a fixed axial plane lie approximately along a straight line which intersects the cutter axis at acute angle A, Fig. 2. This means that the point width 49 of the cutters remains constant despite resharpening of the blades, and that to restore the cutter to its initial relationship to the work, after resharpening, it is necessary only to adjust both cutters as a unit relative to the work in one direction in the plane of symmetry. That is, when the blades have been sharpened back so that the side and tip cutting edges 44 and 46 when rotated into the plane of Fig. 3 are moved to the respective positions shown at 44' and 46', it is only necessary to effect an adjustment of the cutters in the direction of arrow 51. In practice the juncture of the cutting side face and tip face is usually rounded so that the cutting point 48 is replaced by a small radius.

The plane cutting side face 39 is inclined to the plane of rotation about axis 21 at an acute angle B, Fig. 6. In the illustrated embodiment this angle, called the dish angle, is on the order of three degrees as measured in the cutter axial plane 52 through the center of the blade (see Figs. 4 and 8). Without a dish angle the cutting surface of revolution described by edge 44 rotating about axis 21 is a plane surface so that the tooth surfaces cut in the work W will be straight from end to end. With the dish angle the cutting surface of revolution is substantially conical and produces tooth surfaces that are crowned or made convex from end to end, this being desirable in order to localize the tooth bearing, to prevent the area of contact of mating teeth from extending to the extreme ends of the teeth. The amount of such crowning that is wanted depends upon the face width of the gears and it may be varied by changing the dish angle in a manner described hereinafter.

The plane cutting side face 39 is also inclined with respect to the plane of cutter rotation by an acute angle C in the plane of Fig. 8, i.e. in a plane perpendicular to both the plane of rotation and axial plane 52. This inclination provides cutting clearance back of side cutting edge 44, and is on the order of three degrees in the illustrated embodiment.

The plane front face 42 of the blade is inclined to axial plane 52 (and also to the front face 34 of the shank which is parallel to plane 52) to provide side rake and hook. In the illustrated embodiment the rake angle D, of tip cutting edge 46 projected into the plane of Fig. 8, is about eighteen and one-half degrees, while the hook angle E, of side cutting edge 44 projected into the plane of Fig. 4, is about six degrees.

The clearance side face 41 is a conical surface whose axis is coincident with cutter axis 21. The cone angle of this surface is the angle A, Fig. 2. The line of intersection of face 41 with tip face 43 is designated 53. It substantially parallels line 47 so that the width of the tip face, 54 in Fig. 3, is substantially constant from end to end, i.e. from edge 46 to rear face 35. The blades must always overlap to at least a slight amount in order to avoid a fin at the center of the root land of the work and to avoid cutting with the clearance side edges of the blades. The amount by which the cutters can be adjusted, vertically relative to each other in Fig. 3, to vary the point width 49, is therefore limited to a distance slightly less than the tip face width 54. Accordingly keeping width 54 constant preserves the range of adjustment throughout the life of the cutter blades. The line of intersection 53 is made substantially parallel to intersection line 47 by disposing the axis 45 in offset parallel relation to axis 21, the amount and direction of such offset for any particular case being determinable either mathematically, by layout or by trial. In addition to maintaining the tip face width constant the offsetting of axis 45 results in cutting clearance for the tip face back of its cutting edge 46.

In order to keep as constant as practical throughout the blade life the angle between the axis 21 and the surface of revolution described by the side cutting edge 44, the blade preferably is sharpened by successively grinding or otherwise cutting back the front face in parallel planes, rather than in relatively inclined planes, to thereby produce side and tip cutting edges located as indicated at 44″ and 46″ in Figs. 7 and 8. It will be seen that if the edges 44 and 44″ were in a plane perpendicular to axis 21, i.e. if there were no dish angle B, or if there were a negative hook angle of a magnitude sufficient to cancel out the dish angle, then the only effect of sharpening back in parallel planes would be to shift the successive side cutting edges along axis 21, such shifting resulting from the clearance angle C. But the dish angle (unless compensated for by negative hook) causes the angle F, Fig. 5, of the cutting surface of revolution to change slightly as the blade is sharpened back. However with a dish angle of no more than a few degrees the magnitude of this change is such that there is no observable change in the pressure angle of the tooth surfaces produced on the work.

In order to obtain a particular location of the bearing along the profiles of mating gear teeth it is sometimes desired to slightly change the pressure angle of the teeth of one member of the pair. This may be accomplished by a correspondingly slight change in the effective pressure angle of the cutter blade, i.e. angle F in Figs. 3 and 5. Such change can be made in the cutter blades merely by increasing or decreasing the hook angle E to which the front faces 42 are sharpened. For example if the hook angle is increased to bring the side cutting edge 44a to the position shown in broken lines in Figs. 4 and 5, the effect will be to decrease the pressure angle F by angle G, Fig. 5. It will be understood of course that the hook angle of edge 44a is greatly exaggerated and that in practice a hook angle change of not more than a few degrees will ordinarily suffice to effect desired changes of bearing position along the tooth profiles.

The same cutter blades may be used to cut tooth surfaces with the greatly different amounts of tooth crowning that is desirable for gears of different face widths, by changing the angular relationship between the blades and the cutter axis 21. This may be accomplished by providing a series of different cutter head assemblies including heads 23, wedges 31 and blade locating rings 26. One head assembly of the series may support the blades in the position shown in Figs. 4 to 7, wherein the plane side faces 36 of the blade shanks lie perpendicular to the cutter axis 21. Other head assemblies of the series may support the blades with plane faces 36 inclined to the cutter axis 21 to provide both larger and smaller dish angles. In Fig. 9 there is shown in broken lines a blade positioned relative to axis 21 exactly as in Figs. 4 to 7 with its shank inner side face 36 perpendicular ot axis 21. In full lines is shown the same blade positioned in a head assembly, comprising head 23', wedge 31' and blade locating ring 26', so formed that the dish angle is increased, and the cutter pressure angle decreased, by the angle H which the shank face 36 now makes with axis 21. All of the head assemblies of a series are preferably so designed that the cutting tip points 48 of new or standard length blades will be in the same position relative to the machine spindle 25, to facilitate cutter gaging.

Having now described a preferred embodiment of my invention what I claim is:

1. A rotary cutter for gears and the like which is one of a symmetrical pair of cutters adapted to rotate on intersecting axes that are equally and oppositely inclined to the plane of symmetry, the cutter having at least one blade projecting radially from the cutter body, said blade having a cutting side face and a front face which intersect along a side cutting edge, and a tip face which intersects the front face along a tip cutting edge, the cutting side face and the tip face being relieved back of their respective cutting edges, and the cutting side face being plane and intersecting the tip face along a curved line which as the cutter rotates intersects the plane common to the cutter rotation axes at a substantially constant distance from the plane of symmetry.

2. A rotary cutter for gears and the like having at least one blade projecting radially from the cutter body, said blade having a cutting side face and a front face which intersect along a side cutting edge, and a tip face which intersects the front face along a tip cutting edge, the cutting side face and the tip face being relieved back of their respective cutting edges, and the cutting side face being plane and intersecting the tip face along a curved line all points of which when rotated into the same plane containing the cutter rotation axis lie approximately along a straight line which intersects the cutter rotation axis at an acute angle.

3. A rotary cutter according to claim 2 in which the tip face is a conical surface whose axis is in parallel offset relation to the cutter rotation axis to provide the relief back of the tip cutting edge, and in which the tip face is of substantially constant width throughout its length.

4. A rotary cutter according to claim 2 in which said blade has a clearance side face that is a conical surface whose axis is coincident with the cutter rotation axis.

5. A rotary cutter according to claim 4 in which the tip face is a conical surface whose axis is in parallel offset relation to the cutter rotation axis, and the line of intersection of the tip face with the clearance side face is at a substantially constant distance from the line of intersection of the tip face and the cutting side face throughout its length.

6. The method of successively sharpening a blade of a rotary cutter that projects radially from the cutter body and has a cutting side face and a front face which intersect along a side cutting edge, and a tip face which intersects the front face along a tip cutting edge, the cutting side face being plane and intersecting the tip face along a curved line all points of which when rotated about the cutter rotation axis into a common plane containing said axis lie approximately along a straight line which intersects said axis at an acute angle, which method consists of successively cutting back the front face in parallel planes.

7. A pair of rotary gear cutters having radial blades and adapted to operate with their axes of rotation intersecting and with their blades in interlocking relationship so as to operate simultaneously in the same tooth space of a gear being cut, each blade having cutting and clearance side faces, and front and tip faces, the cutting side face and the front face both being plane and intersecting with each other at an acute angle to form a straight line side cutting edge, the side cutting face being inclined to the plane of rotation of the cutter at a small angle in an axial plane through the center of the blade, whereby the side-cutting edge will describe a dished surface of revolution, and the side cutting face also being inclined, at an acute angle relative to a plane of rotation, about its line of intersection with said axial plane, to thereby provide clearance back of the side-cutting edge, the clearance side face being a conical surface whose axis is coincident with the cutter rotation axis, and the tip cutting face being relieved back of its line of intersection with the front face and being a conical surface whose axis is in such offset parallel relation to the cutter rotation axis that the tip face is of approximately constant width throughout its length.

8. A pair of symmetrical rotary cutters having radial blades and adapted to operate with their axes of rotation intersecting and equally and oppositely inclined to their plane of symmetry, and with their blades in interlocking relationship to enable the cutters to act simultaneously in the same tooth space of a gear being cut, and the cutters being adapted to be sharpened by successively cutting back the front faces of their blades in parallel planes, each blade having a cutting side face intersecting the front face along a side cutting edge and a tip face intersecting the front face along a tip cutting edge, characterized in that the cutting side face is plane and inclined to the related cutter rotation axis to provide clearance back of the side cutting edge, that the tip face is conical with its cone axis offset from said cutter rotation axis to provide clearance back of the tip cutting edge and to so relate said plane and conical surfaces that all points along their curved line of intersection, when rotated about said cutter rotation axis into the plane common to the two cutter rotation axes, lie along a line that is substantially parallel to the plane of symmetry.

9. A pair of cutters according to claim 8 wherein each blade has a clearance side face that is conical and has its cone axis coincident with said cutter rotation axis, and the cone angle of the clearance side face being such that the cone element in said common plane is parallel to said line, whereby the tip face is of substantially constant width throughout its length.

References Cited in the file of this patent

UNITED STATES PATENTS

| | | |
|---|---|---|
| 795,021 | Beale | July 18, 1905 |
| 2,052,804 | Scott | Sept. 1, 1936 |
| 2,218,786 | Candee | Oct. 22, 1940 |
| 2,228,966 | Miller | Jan. 14, 1941 |
| 2,308,734 | Wildhaber | Jan. 19, 1943 |
| 2,338,061 | Ross | Dec. 28, 1943 |
| 2,524,301 | Bauer | Oct. 3, 1950 |
| 2,567,273 | Carlsen | Sept. 11, 1951 |
| 2,586,451 | Wildhaber | Feb. 19, 1952 |
| 2,674,030 | Wildhaber | Apr. 6, 1954 |